United States Patent
Musick

(10) Patent No.: US 9,893,479 B1
(45) Date of Patent: Feb. 13, 2018

(54) RIGHT-ANGLED ELECTRICAL PLUG

(71) Applicant: Delphi Technologies, Inc., Troy, MI (US)

(72) Inventor: Steven A. Musick, Burton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 15/382,990

(22) Filed: Dec. 19, 2016

(51) Int. Cl.
| | |
|---|---|
| H01R 4/66 | (2006.01) |
| H01R 24/30 | (2011.01) |
| H01R 13/05 | (2006.01) |
| H01R 13/50 | (2006.01) |
| H01R 13/405 | (2006.01) |
| H01R 103/00 | (2006.01) |

(52) U.S. Cl.
CPC ............ *H01R 24/30* (2013.01); *H01R 13/05* (2013.01); *H01R 13/405* (2013.01); *H01R 13/50* (2013.01); *H01R 2103/00* (2013.01)

(58) Field of Classification Search
CPC .. H01R 2103/00; H01R 13/50; H01R 13/405; H01R 13/05; H01R 24/30
USPC ................................ 439/106, 107, 466, 694
See application file for complete search history.

(56) References Cited

U.S. PATENT DOCUMENTS

| | | | |
|---|---|---|---|
| 7,220,136 B1* | 5/2007 | Green | H01R 25/00 439/106 |
| 8,128,434 B1* | 3/2012 | Gandolfi | H01R 13/6666 439/620.31 |
| 8,684,771 B2* | 4/2014 | Bhosale | H01R 13/35 439/106 |
| 2009/0225486 A1* | 9/2009 | Wadsworth | H01R 31/065 361/118 |
| 2009/0284875 A1* | 11/2009 | Ford | H01R 13/6683 361/13 |
| 2015/0318638 A1* | 11/2015 | McClelland | H01R 13/629 439/105 |
| 2017/0025854 A1* | 1/2017 | Willis | H02J 3/14 |

FOREIGN PATENT DOCUMENTS

WO 2014036013 A2 3/2014

\* cited by examiner

*Primary Examiner* — Abdullah Riyami
*Assistant Examiner* — Nelson R Burgos-Guntin
(74) *Attorney, Agent, or Firm* — Robert J. Myers

(57) ABSTRACT

A right-angled electrical plug includes a first plug terminal and a second plug terminal longitudinally spaced apart from one another. First and second electrical wires are interconnected with the first and second plug terminals respectively. A housing configured to secure the first and second plug terminals has a generally planar surface from which the first and second plug terminals project and has a portal through which the first and second electrical wires exit the housing. The surface has a first lateral edge that is closer to the portal than a second lateral edge opposite the first lateral edge. A first distance between the first lateral edge and the first plug terminal is at least two times less, and is preferably is at least three time less, than a second distance between the second lateral edge and the second plug terminal. The right-angled electrical plug may conform to NEMA 5-15P standards.

12 Claims, 7 Drawing Sheets

RIGHT-ANGLED ELECTRICAL PLUG

TECHNICAL FIELD OF THE INVENTION

The present invention relates generally to right-angled electrical plugs and, more particularly, to right-angled electrical plugs having an extended housing.

BACKGROUND OF THE INVENTION

Right-angled electrical plugs are used to connect electrical devices with electrical sockets. There are several issues that may arise in the use of these plug/socket combinations. As shown in FIG. 1, an operator 1 may attempt to remove the plug 3 from the socket by grasping the electrical cord 5 attached to the plug 3 and pulling on the cord 5 rather than properly grasping the plug 3. As shown in FIG. 2, this may cause the plug 3 to rotate in the socket and cause damage to the terminals 2 that result in increased electrical resistance and resulting in higher terminal temperatures in use or could cause a terminal to facture. This is particularly true of plugs conforming to the National Electrical Manufacturers Association (NEMA) 5-15P standard connected within sockets conforming to the NEMA 5-15S standard. These plugs have two blade style terminals (neutral and hot) that are aligned with the direction of rotation and one round pin terminal (ground). The blade terminals can easily rotate within their rectangular sockets, but the round terminal is constrained within its round socket and is more likely to bend or break.

Similar rotation of the plug 3 in the socket may also be caused by an electrical device 6, such as an electric vehicle battery charger, also known as electric vehicle service equipment (EVSE), hanging from an outlet 7 where the socket 8 is oriented such that the cord exits the top of the plug and then curves outwardly to extend to the EVSE as shown in FIG. 3.

Therefore, a needs exists for a right-angled electrical plug designed to inhibit damage to plug terminals caused by rotation of the plug terminals in the socket.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with an embodiment of the invention, a right-angled electrical plug, such as those used with an electrical vehicle battery charger, is provided. The right-angled electrical plug includes a first plug terminal and a second plug terminal longitudinally spaced apart from one another, first and second electrical wires interconnected with the first and second plug terminals respectively, and a housing configured to secure the first and second plug terminals. The housing has a generally planar surface from which the first and second plug terminals project. The housing also has a portal through which the first and second electrical wires exit the housing. The surface has a first lateral edge that is closer to the portal than a second lateral edge that is opposite the first lateral edge. A first distance between the first lateral edge and the first plug terminal is at least two times less than a second distance between the second lateral edge and the second plug terminal and is preferably is at least three times less than the second distance. The right-angled electrical plug conforms to NEMA 5-15P standards.

The first plug terminal may be a ground terminal having a round cross section and the second plug terminal may be a hot or neutral terminal having a rectangular cross section. Alternatively, the first plug terminal may be the hot or neutral terminal having a rectangular cross section and the second plug terminal may be the ground terminal having a round cross section.

The housing may consist of a single piece of injection molded plastic. The right-angled electrical plug may be interconnected to an electric vehicle battery charger via the first and second electrical wires.

In accordance with another embodiment of the invention, a right-angled electrical plug, configured to be connected to a duplex electrical receptacle having a first receptacle and a second receptacle such as those used with an electrical vehicle battery charger, is provided. The right-angled electrical plug includes a hot plug terminal and a neutral plug terminal. The right-angled electrical plug also includes a ground plug terminal longitudinally spaced apart from the hot plug terminal and the neutral plug terminal. The right-angled electrical plug further includes hot, neutral, and ground wires interconnected with the hot, neutral, and ground plug terminals respectively and a housing configured to secure the hot, neutral, and ground plug terminals. The housing has a generally planar surface from which the hot, neutral, and ground plug terminals project. The housing also has a portal through which the hot, neutral, and ground wires exit the housing. The surface has a first lateral edge that is closer to the portal than a second lateral edge opposite the first lateral edge. A first distance between the first lateral edge and the ground plug terminal is at least two times, preferably three times, less than a second distance between the second lateral edge and the hot plug terminal or the neutral plug terminal. The surface extends past the second receptacle when the hot, neutral, and ground plug terminals are inserted within corresponding sockets of the first receptacle. The right-angled electrical plug conforms to NEMA 5-15P standards, and the first and second receptacles conform to NEMA 5-15S standards.

The housing may consist of a single piece of injection molded plastic. The right-angled electrical plug may be interconnected to an electric vehicle battery charger via the ground, neutral, and hot wires.

A portion of the surface may define an aperture extending therethrough and wherein the second receptacle is accessible when the hot, neutral, and ground plug terminals are inserted within the corresponding sockets of the first receptacle. This aperture may be characterized as a notch extending inwardly from the second edge.

The foregoing and other objects, features, and advantages of the invention will be apparent from the following detailed descriptions of embodiments of the invention the accompanying drawings of these embodiments.

BRIEF DESCRIPTION OF THE SEVERAL VIEWS OF THE DRAWING

The present invention will now be described, by way of example with reference to the accompanying drawings, in which.

Similar elements in the different embodiments illustrated here are identified by three digit reference numbers wherein the last two digits of the reference numbers are the same.

DETAILED DESCRIPTION OF THE INVENTION

Presented herein is a description a right-angled electrical plug that conforms to the National Electrical Manufacturers Association (NEMA) 5-15P standard and is configured to be connected to a receptacle conforming to the NEMA 5-15S standards. The right-angled electrical plug includes an extended housing that moves the pivot point of the plug further from the ground terminal when the plug is improperly removed from the receptacle or when a piece of electrical equipment is hanging from the plug (see FIGS. 1-3). As will be described below, moving the pivot point reduces the occurrence of damage to the ground terminal caused by improper removal.

Figure 4:
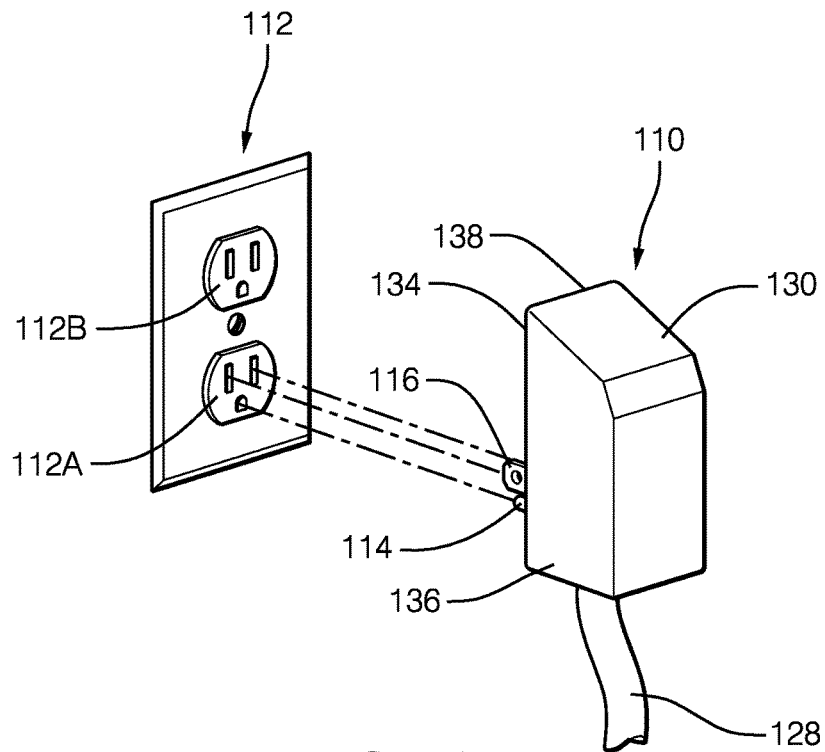
FIG. 4 is a perspective front view of a right-angled electrical plug and a duplex receptacle according to an embodiment of the invention.
Figure 5:
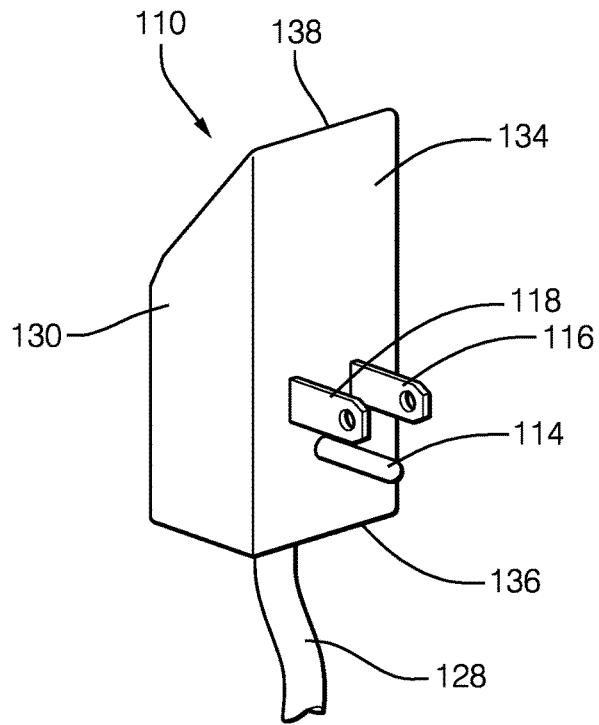
FIG. 5 is a perspective rear view of the right-angled electrical plug of FIG. 4 according to an embodiment of the invention.
Figure 6:
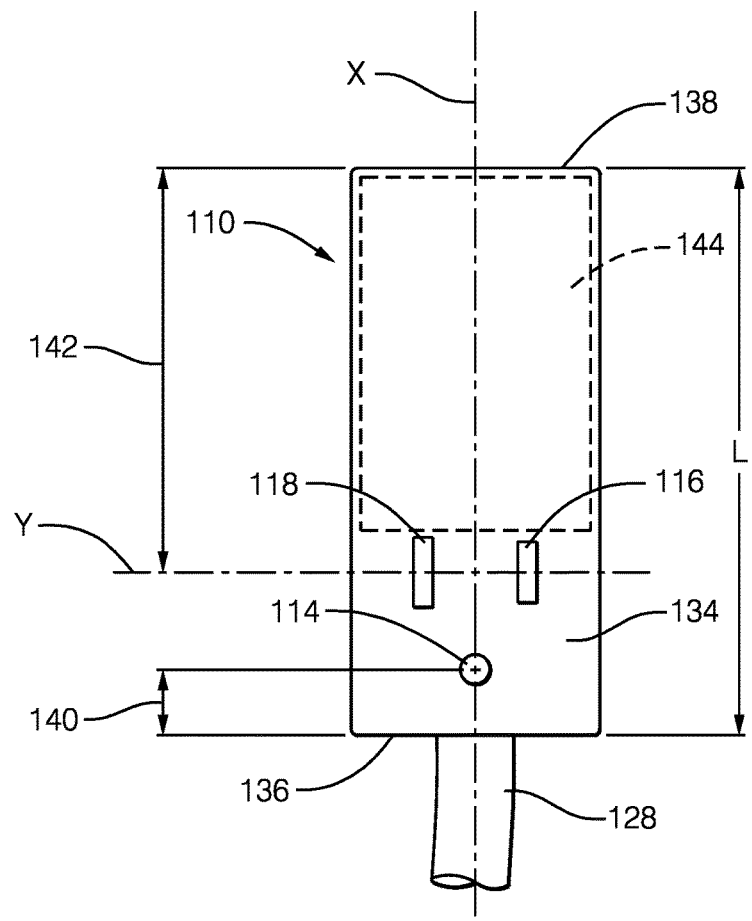
FIG. 6 is a rear view of the right-angled electrical plug of FIG. 4 according to an embodiment of the invention.
Figure 7:
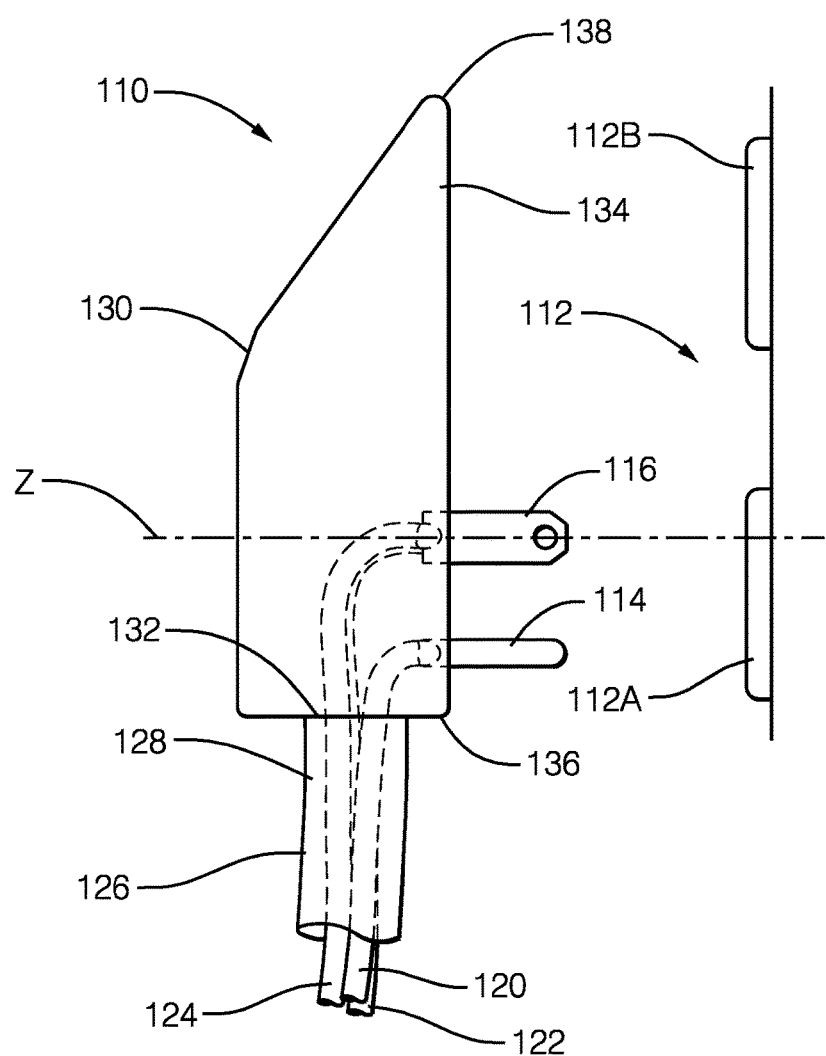
FIG. 7 is a cut away side view of the right-angled electrical plug and a duplex receptacle of FIG. 4 according to an embodiment of the invention.

FIGS. 4-8 illustrate a non-limiting example of a right-angled electrical plug 110, hereinafter referred to as the plug 110 that is configured to be connected to an electrical receptacle, shown in FIG. 4 as a duplex receptacle 112 having two individual receptacles 112A, 112B each conforming to the NEMA 5-15S standard. As shown in FIGS. 5 and 6, the plug 110 includes a first plug terminal 114 in the form of a pin having a generally rounded cross section, hereinafter referred to as the ground terminal 114, a second plug terminal 116 in the form of a blade having a generally rectangular cross section, hereinafter referred to as the neutral terminal 116, and a third plug terminal 118 also in the form of a blade having a slightly smaller rectangular cross section than the neutral terminal 116, hereinafter referred to as the hot terminal 118. As illustrated in FIG. 7, ground, neutral, and hot wires 120, 122, 124 are connected to the ground, neutral, and hot terminals 114, 116, 118 respectively. These ground, neutral, and hot wires 120, 122, 124 interconnect the plug 110 with an electrical device, such as an electric vehicle battery charger (not shown). The ground, neutral, and hot wires 120, 122, 124 are enclosed by a protective jacket 126 and the wires and jacket are referred to hereinafter as the cord 128.

The plug 110 includes a housing 130 that is configured to secure the ground, neutral, and hot terminals 114, 116, 118. The housing 130 has a portal 132 through which the ground, neutral, and hot wires 120, 122, 124 exit the housing 130 along a longitudinal axis of the housing 130. The housing 130 also has a generally planar surface 134 from which the ground, neutral, and hot terminals 114, 116, 118 project along an axis which is substantially perpendicular to the longitudinal axis X. As used herein, substantially perpendicular means±10° of absolutely perpendicular. This axis is hereinafter referred to as the vertical axis. The surface 134 has a first lateral edge, hereinafter referred to as the first edge 136, that is substantially perpendicular to the longitudinal axis and is closer to the portal 132 than a second lateral edge hereinafter referred to as the second edge 138 that is opposite this first edge 136 and substantially parallel to the first edge 136. As used herein, substantially parallel means±10° of absolutely parallel. The surface 134 includes an extension portion 144 between the neutral and hot terminals 116, 118 and the second edge 138. This extension porting increases the longitudinal length L of the plug 110 so that a first distance 140 between the first edge 136 and the ground terminal 114 is at least two times less, and preferably at least three times less, than a second distance 142 between the second edge 138 and the hot and/or neutral terminals 118, 116.

Figure 1:
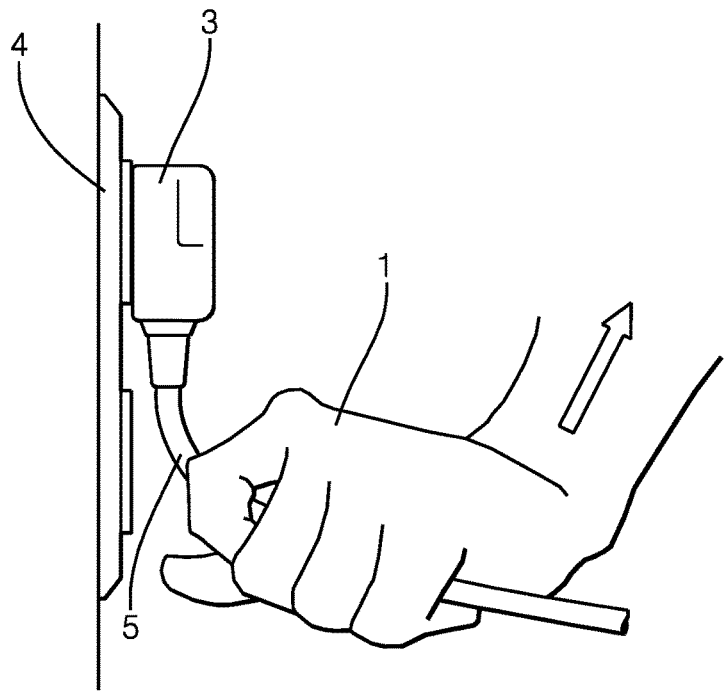
FIG. 1 is a side view of an operator improperly removing a right-angled electrical plug from an electrical socket according to the prior art.
Figure 2:
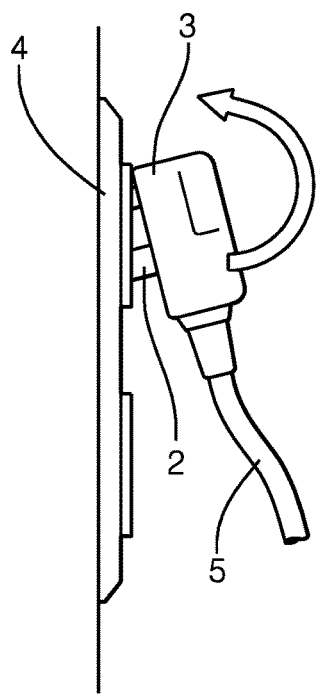
FIG. 2 is a side view of rotation of a right-angled electrical plug in the electrical socket according to the prior art.
Figure 3:
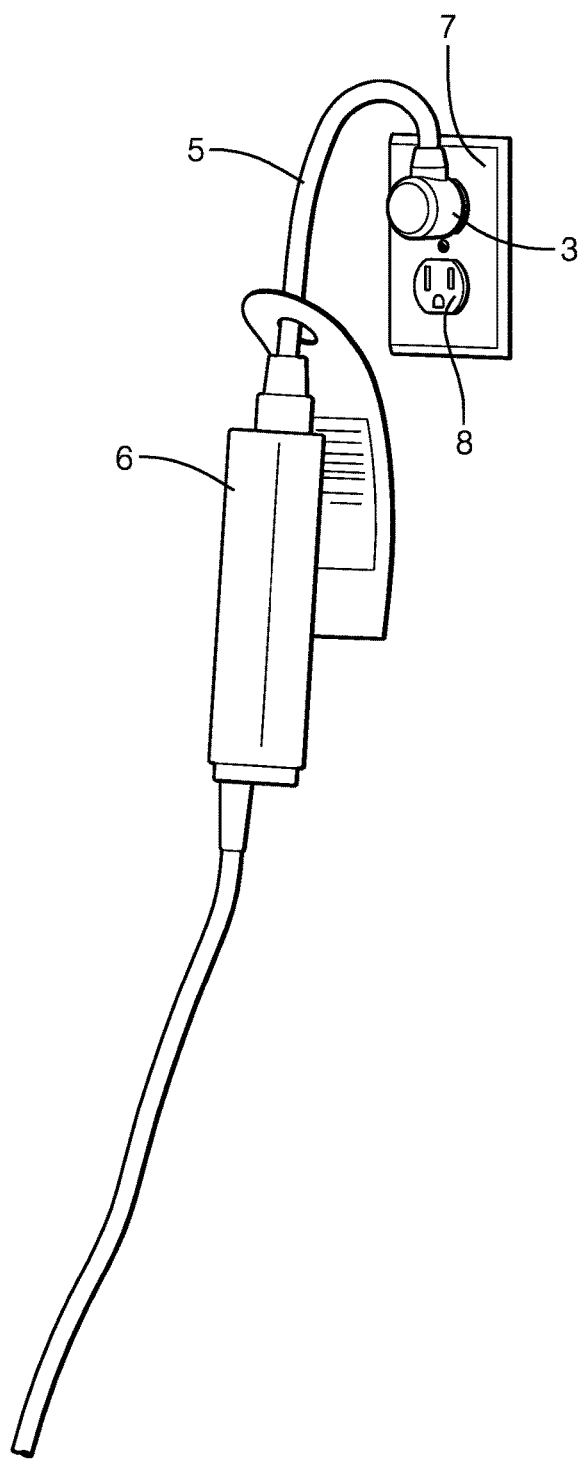
FIG. 3 is a perspective view of an electrical device hanging from a right-angled electrical plug in an electrical socket according to the prior art.
Figure 8:
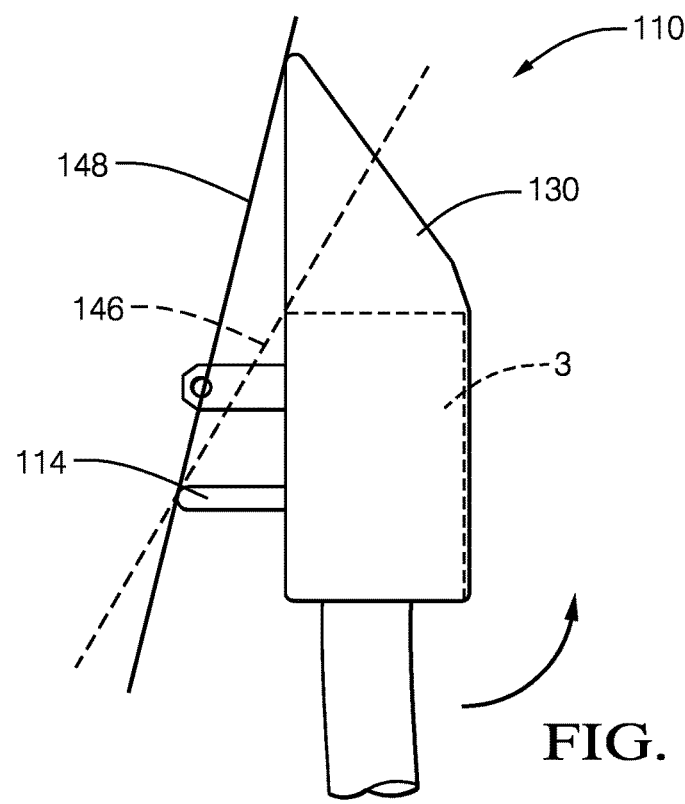
FIG. 8 is a side view comparing the pivot points of the right-angled electrical plug of FIG. 4 according to an embodiment of the invention and the right-angled electrical plug of FIG. 1 according to the prior art.

FIG. 8 illustrates a comparison of the length of a lever arm 146 for a plug 3 according to the prior art (see FIGS. 1-3, shown here in dotted line) versus the length of a lever arm 148 for the plug 110. Without subscribing to any particular theory of operation, the neutral and hot terminals 116, 118 are free to rotate since the blades of these terminals are generally parallel to the corresponding sockets while the round ground terminal 114 is substantially surrounded by the round ground socket when the plug 110 is improperly removed from a receptacle by an operator pulling on the cord 128 rather than the plug 110. The extension portion 144 moves the second edge 138 farther from the ground terminal 114, thereby increasing the length of a lever arm 148 applied to the ground terminal 114. Since the stress on the ground terminal 114 is inversely proportional to the length of a lever arm 148, the ground terminal 114 of the plug 110 will experienced reduced stress compared to the ground terminal of the prior art plug 3, thereby reducing the probability of damage to the ground terminal 114 by improper removal of the plug 110 from the receptacle.

Figure 9:
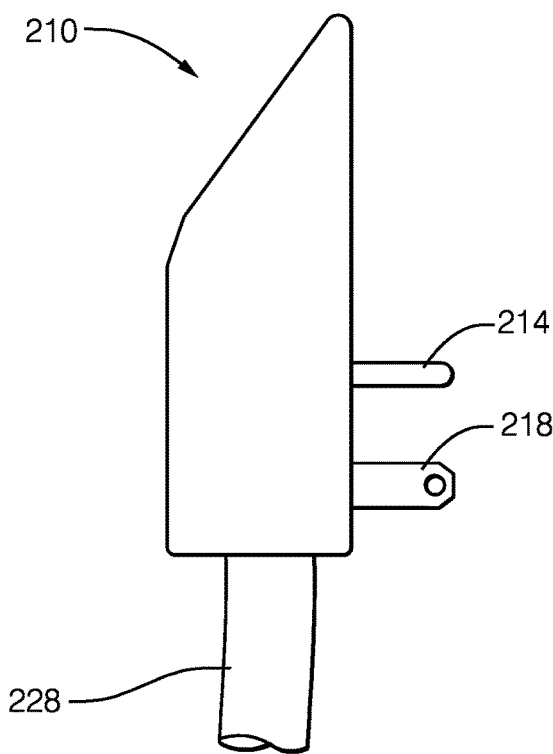
FIG. 9 is a side view of a right-angled electrical plug according to another embodiment of the invention.
Figure 10:
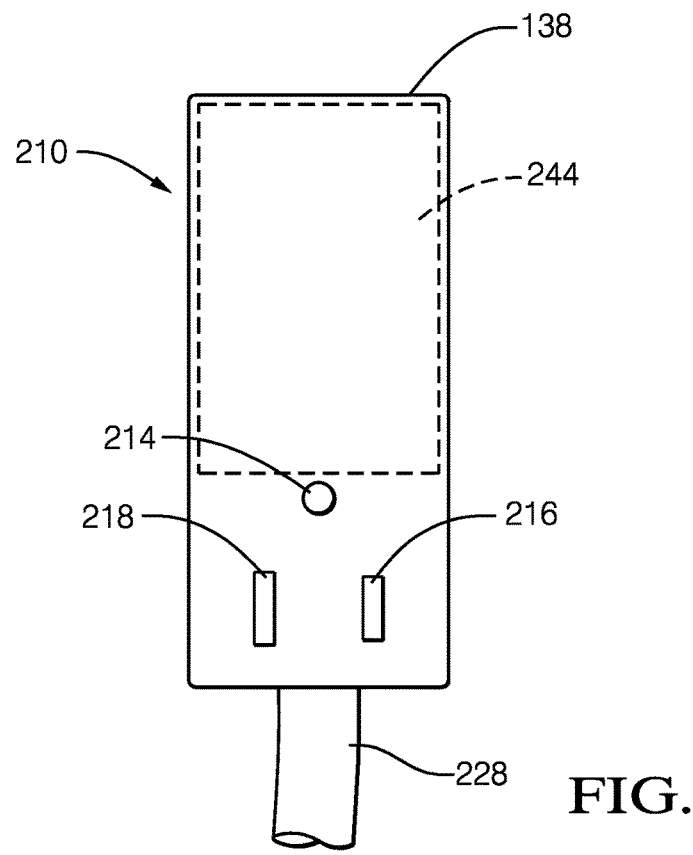
FIG. 10 is a rear view of the right-angled electrical plug of FIG. 10 according to another embodiment of the invention.

FIGS. 9 and 10 illustrate another non-limiting example of a right-angled electrical plug 210, hereinafter referred to as the plug 210, wherein the location of the hot and neutral and the ground terminals 218, 216, 214 are reversed in relation to the first edge 236 compared to the plug 110. This plug 210 may be beneficial in applications where the ground socket of the receptacle is in an upwards orientation relative to the ground and neutral sockets so that the cord 228 does not hang over the plug 210 which may increase stress in the ground, neutral, and hot wires. The extension portion 244 of the plug 210 also moves the second edge 238 farther from the ground terminal 214, thereby increasing the length of the lever arm applied to the ground terminal 214 and provides similar benefits regarding reducing the probability of damage to the ground terminal 214 as the plug 210.

Figure 11:
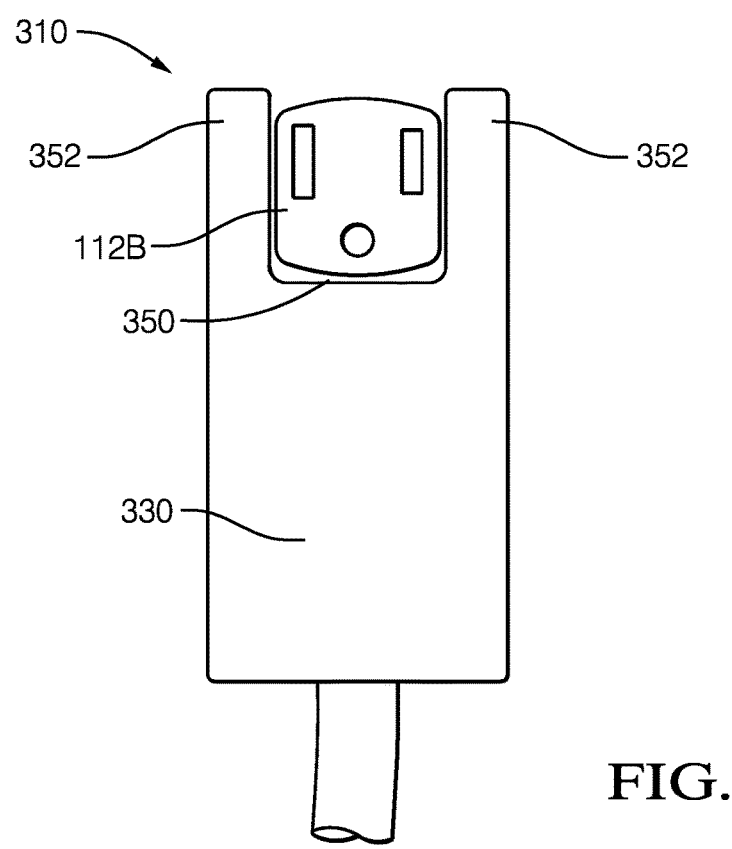
FIG. 11 is a front view of a right-angled electrical plug connected with a duplex receptacle according to yet another embodiment of the invention.

FIG. 11 illustrates yet another non-limiting example of a right-angled electrical plug 310, hereinafter referred to as the plug 310. The plug 310 has the same configuration of hot, neutral, and ground terminals as plug 110. The housing 330 is configured so that the surface extends past the second receptacle 112B when the hot, neutral, and ground terminals are inserted within corresponding sockets of the first receptacle 112A. A portion of the surface defines an aperture 350 that extends through the housing 330 so that the second receptacle 112B of a duplex receptacle 112 is accessible when the hot, neutral, and ground terminals are inserted within the corresponding sockets of the first receptacle 112A so that the second receptacle 112B can accept another electrical plug when the plug 310 is inserted into the first receptacle 112A of the duplex receptacle 112. The aperture 350 here is characterized as a notch extending inwardly from the second edge. A pair or triangularly shaped ribs 352 extend from the housing 330 along the longitudinal edges of the surface flanking the second receptacle 112B and provide the extension portion of the surface. Alternative embodiments of the plug may be envisioned having apertures with other shapes that allow access to the second receptacle 112B.

The illustrated examples of the plugs all includes housings having a wedge shape over the extension portion of the surface. This wedge shape provides the advantage of giving adequate support to the surface while reducing the amount of material required to form the housing, especially if the housing is formed of a single piece of injection molded plastic. Other embodiments of the plugs may be envisioned with a housing that is characterized as having a rectangular prism or "brick" shape.

The illustrated examples of the plugs all conform to the NEMA 5-15P standard. However, other embodiments of the invention that provide similar benefits and conform to different technical standards, such as Europlug CCE 7/16, British Standard (BS) 1363, Australian/New Zealand Standard AS/NZS 3112, or Chinese PPCS-CCC technical standards, but especially plugs having a mix of parallel blade terminals and round terminals, e.g. NEMA 5-15P, 6-15P, 6-30P, 6-50P, and 14-50P, may be envisioned.

Accordingly, a right-angled electrical plug is provided. The plug has an extended housing that increases the lever arm length on the ground terminal when an operator improperly removes the plug from the receptacle by pulling on the cord, thereby providing the benefit of reducing the likelihood of damage to the ground terminal when this occurs. The plug may be configured so that a second receptacle of a duplex receptacle is useable when the plug is connected to the first receptacle.

While this invention has been described in terms of the preferred embodiments thereof, it is not intended to be so limited, but rather only to the extent set forth in the claims that follow. Moreover, the use of the terms first, second, upper, lower, etc. does not denote any order of importance, location, or orientation, but rather the terms first, second, etc. are used to distinguish one element from another. Furthermore, the use of the terms a, an, etc. do not denote a limitation of quantity, but rather denote the presence of at least one of the referenced items.

I claim:

1. A right-angled electrical plug, comprising:
a first plug terminal and a second plug terminal longitudinally spaced apart from one another;
first and second electrical wires interconnected with the first and second plug terminals respectively; and
a housing configured to secure the first and second plug terminals having a generally planar surface from which the first and second plug terminals project and having a portal through which the first and second electrical wires exit the housing, said surface having a first lateral edge that is closer to the portal than a second lateral edge opposite the first lateral edge, wherein a first distance between the first lateral edge and the first plug terminal is at least two times less than a second distance between the second lateral edge and the second plug terminal and wherein the right-angled electrical plug conforms to NEMA 5-15P standards.

2. The right-angled electrical plug according to claim 1, wherein the first distance is at least three times less than the second distance.

3. The right-angled electrical plug according to claim 1, wherein the first plug terminal has a round cross section and the second plug terminal has a rectangular cross section.

4. The right-angled electrical plug according to claim 1, wherein the first plug terminal has a rectangular cross section and the second plug terminal has a round cross section.

5. The right-angled electrical plug according to claim 1, wherein the housing consists of a single piece of injection molded plastic.

6. The right-angled electrical plug according to claim 1, wherein the right-angled electrical plug is interconnected to an electric vehicle battery charger via the first and second electrical wires.

7. A right-angled electrical plug configured to be connected to a duplex electrical receptacle having a first receptacle and a second receptacle, said right-angled electrical plug comprising:
a hot plug terminal and a neutral plug terminal;
a ground plug terminal longitudinally spaced apart from the hot plug terminal and the neutral plug terminal;
hot, neutral, and ground wires interconnected with the hot, neutral, and ground plug terminals respectively; and
a housing configured to secure the hot, neutral, and ground plug terminals having a generally planar surface from which the hot, neutral, and ground plug terminals project and having a portal through which the hot, neutral, and ground wires exit the housing, said surface having a first lateral edge that is closer to the portal than a second lateral edge opposite the first lateral edge, wherein a first distance between the first lateral edge and the ground plug terminal is at least two times less than a second distance between the second lateral edge and the hot plug terminal or the neutral plug terminal, wherein the surface extends past the second receptacle when the hot, neutral, and ground plug terminals are inserted within corresponding sockets of the first receptacle, wherein the right-angled electrical plug conforms to NEMA 5-15P standards, and wherein the first and second receptacles conform to NEMA 5-15S standards.

8. The right-angled electrical plug according to claim 7, wherein the first distance is at least three times less than the second distance.

9. The right-angled electrical plug according to claim 7, wherein the housing consists of a single piece of injection molded plastic.

10. The right-angled electrical plug according to claim 7, wherein the right-angled electrical plug is interconnected to an electric vehicle battery charger via the hot, neutral, and ground wires.

11. The right-angled electrical plug according to claim 7, wherein a portion of the surface defines an aperture extending therethrough and wherein the second receptacle is accessible when the hot, neutral, and ground plug terminals are inserted within the corresponding sockets of the first receptacle.

12. The right-angled electrical plug according to claim 11, the aperture is characterized as a notch extending inwardly from the second edge.

\* \* \* \* \*